United States Patent [19]

Clark et al.

[11] Patent Number: 4,852,077

[45] Date of Patent: Jul. 25, 1989

[54] OPTICAL DATA STORAGE MEDIA WITH SPATIALLY VARIABLE ENERGY ABSORPTIVITY

[75] Inventors: Bryan K. Clark, Sunnyvale; Robert Guerra, Santa Clara, both of Calif.

[73] Assignee: Tandy Corporation, Fort Worth, Tex.

[21] Appl. No.: 152,778

[22] Filed: Feb. 5, 1988

[51] Int. Cl.⁴ ............................................. G11B 7/24
[52] U.S. Cl. ................................. 369/284; 346/135.1; 369/286; 430/945
[58] Field of Search ............... 369/100, 275, 284, 283, 369/286; 346/135.1; 430/19, 945

[56] References Cited

U.S. PATENT DOCUMENTS

| | | | |
|---|---|---|---|
| 4,430,659 | 2/1984 | Maffitt et al. | 369/100 |
| 4,527,173 | 7/1985 | Gupta et al. | 369/100 |
| 4,578,788 | 3/1986 | Ahn et al. | 346/135.1 |
| 4,651,172 | 3/1987 | Watanabe et al. | 346/135.1 |
| 4,709,363 | 11/1987 | Dirks et al. | 369/275 |
| 4,719,615 | 1/1988 | Feyrer et al. | 369/288 |

FOREIGN PATENT DOCUMENTS 0136070  8/1984  European Pat. Off. .

OTHER PUBLICATIONS

J. S. Hartman et al., Erasable Bilayer Dye-Polymer Optical Recording Medium, pp. 155-158.
S. Miyaoka, Digital Audio is Compact and Rugged, IEEE Spectrum, Mar. 1984, pp. 35-39.

Primary Examiner—Steven L. Stephan
Attorney, Agent, or Firm—Townsend and Townsend

[57] ABSTRACT

Optical data storage media of various technologies, including those with multiple layers of varying absorptivities of light as well as those which are grooved to facilitate tracking, are improved by combining the absorptivity differences with height variations in the interface between the layers (and thereby the relative thicknesses of the layers). The result is a means of varying in a spatial manner in the media themselves the rate at which such media absorb energy. This offers a variety of benefits in both recordation and reading, including helping to focus the heat generated by incident recording beams, increasing tracking sensitivity for both recordation and reading, and preformatting the media as a guide for both recordation and reading.

29 Claims, 3 Drawing Sheets

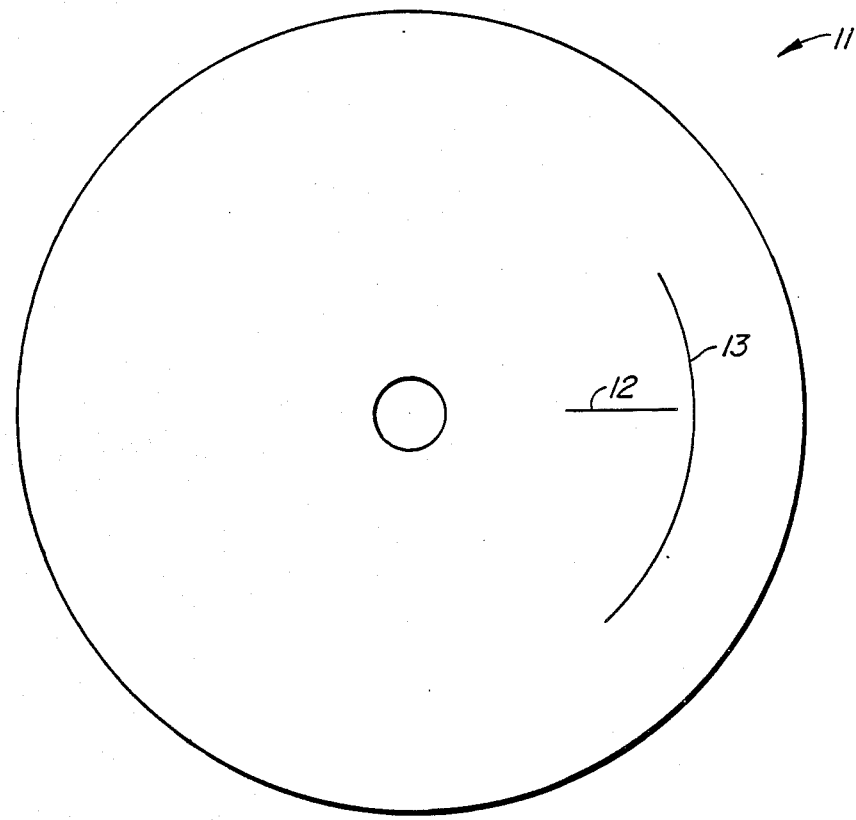
FIG._1.
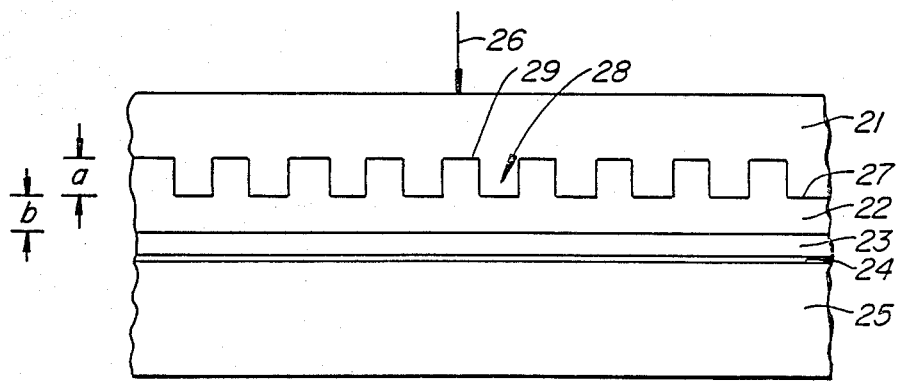
FIG._2.

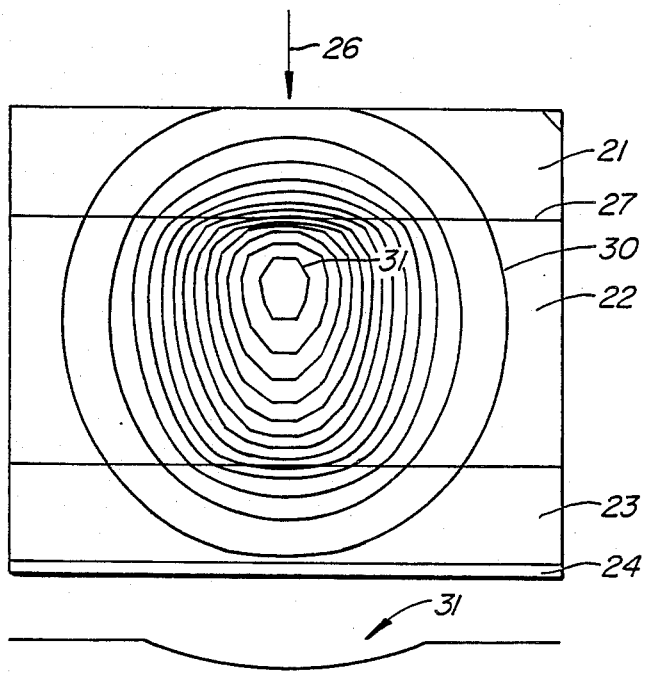
FIG._3a.
PRIOR ART
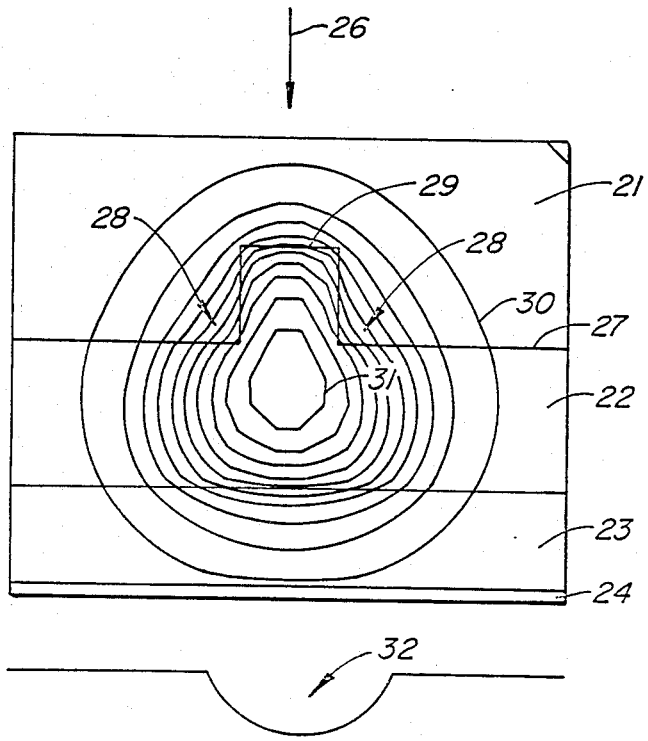
FIG._3b.

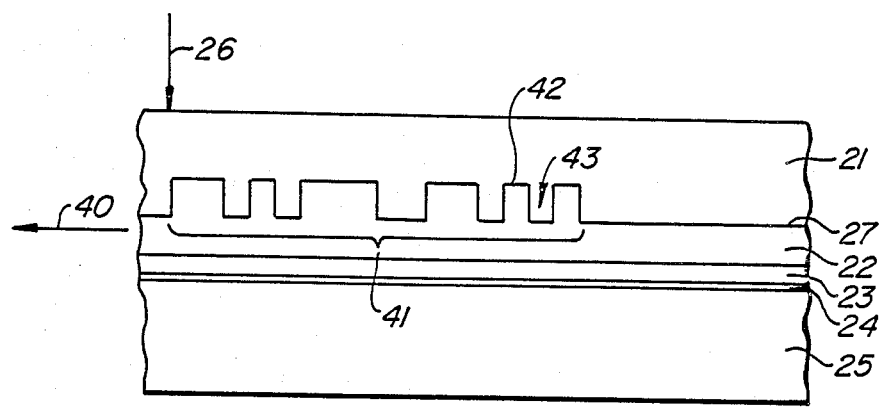
FIG._4.
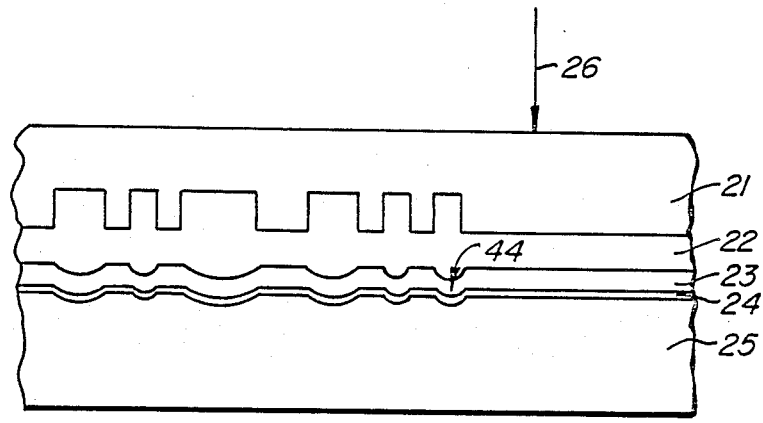
FIG._5.

OPTICAL DATA STORAGE MEDIA WITH SPATIALLY VARIABLE ENERGY ABSORPTIVITY

This invention relates to optical data storage media on which data are recorded by response to the absorption of light energy, and particularly to considerations of focusing the energy as it is absorbed and of centering the recorded signals on a signal track.

BACKGROUND AND SUMMARY OF THE INVENTION

The technology of optical data storage media embraces a broad range of materials and signal mechanisms, including media where recording takes place before media production ("read-only"), media on which data can be directly recorded and becomes permanently fixed ("write-once"), and media which can be both recorded upon and erased ("erasable"). Optical signals fall within three general categories: reflective, transmissive, and absorptive. These signals may be produced in a variety of ways, including the use of pits (or bumps) or holes in certain layers of the media, optical density change materials (such as photographic films, photoresists, and photopolymers, which undergo optical density changes upon absorption of light), phase change materials (undergoing a transition from a crystalline to an amorphous state or vice versa upon absorption of light), magneto-optical materials (where signals are recorded by localized heating under a magnetic field to change the direction of magnetization), and ablative thin films (where the recorded pattern induces light amplitude modulation).

Many of these techniques are examples of thermooptical recording, in which light from a laser is focused on a small, usually diffraction limited spot at a specified depth in the medium. The energy from the focused light heats the spot and effects the change which functions as data storage.

The construction of the medium will vary depending on the type of signal to be recorded on it or 5 built into its structure during fabrication. Optical media in general have a multilayer construction. Of these, some are constructed with contoured (e.g., grooved or pitted) interfaces between the layers either as the source of the signals or as a means for guiding the reading or recording beam to keep it on track. Others are constructed with layers of differing absorptivity.

Examples of optical data storage media which include layers of differing absorptivity are those described in European patent application Publication No. 136070, published on Apr. 3, 1985, entitled "Erasable Optical Data Storage Medium and Method and Apparatus for Recording Data on the Medium" (Optical Data, Inc.); and U.S. patent application Ser. No. 07/153,288, filed on even date herewith. inventors B. Clark, J. Finegan and R. Guerra with the same assignee named herein, entitled "Optical Data Storage Media for Substrate Incident Recording." In such media, binar optical data appear as pits or bumps in an otherwise flat reflecting surface. which may either be a partially reflecting interface between two layers of different refractive indices, or a fully reflecting surface such as a metallic film. Reading of the data is accomplished by passing a laser beam over the pits or bumps and monitoring the intensity of the reflected light. Each pit or bump varies the optical path of the beam, thereby lowering the reflected intensity either by destructive interference when combined with a second beam (not reflected off a pit or bump) or by scattering due to the curvature of the pit or bump.

The formation of these pits or bumps during data recordation is attributable to the structure of the medium, which combines an expansion layer with a retention layer. The expansion layer absorbs energy from a high intensity record beam and expands with the resulting rise in temperature to bulge out to one side. The retention layer converts from a glassy state to a rubbery state upon heating, then back to a glassy state upon cooling. The two layers are configured in such a manner that the retention layer heats up with the expansion layer, becomes rubbery, and conforms to the bulge, then cools back to its glassy state before the expansion layer can cool sufficiently to cause the bulge to retract. The bulge is thus fixed by the retention layer, and serves as the pit or bump which constitutes the data. Erasure of the data is achieved by an erase beam which is absorbed only by the retention layer. The absorbed beam heats the retention layer to its rubbery state, permitting elastic forces in the expansion layer and viscoelastic forces in the retention layer to return both layers to flatness.

One of the difficulties in recording data on these and other thermo-optically recordable media is that the diffraction-limited optics within the recorder limit the beam to a finite width within the media which in some cases may be larger than the desired recording mark. This is especially true of multilayered media such as those described above in which the light absorptivity in adjacent layers differs, and in which the energy deposition in the more absorptive layer occurs through the depth of the layer. This is true both where the thermo-optical layer is the layer of greater absorptivity, and where the thermo-optical layer is the layer of lesser (or zero) absorptivity or some other layer in the medium. In the latter case, the more absorptive layer acts as a filter.

Further difficulties are encountered in multilayered media which use a grooved interface as a means for tracking. In such media, tracking is achieved by monitoring the intensity of light reflected off the interface. The groove depth is such that light reflecting off the top of the groove and light reflecting off the bottom of the groove combine to give a total reflectance, and either a broad beam designed to overlap the sides of the groove or a combination of beams on and off the groove are used, such that the overall reflected intensity varies depending on how well the beam(s) are centered on the track. In media where the index of refraction on both sides of the interface is very close, reflection is weak and the sensitivity of the tracking mechanism is accordingly limited.

The present invention is an improvement over all such types of media. This invention combines interface height variations (i.e., variations in the relative thicknesses of the two layers on either side of the interface) with a differential in light absorptivity between the two layers. The advantages flowing from this combination are numerous, depending on the type of medium to which the invention is applied as well as the type and arrangement of the height variations themselves.

The height variations may for example assume the form of grooves or ridges superimposed over the tracks. In media with layers of different absorptivities, where the more absorptive layer is thermo-optically active, the height variations may form ridges in the more absorptive layer in the track regions, thickening the layer to produce greater light absorption and therefore greater energy deposition in these regions. This increases the degree to which the signal energy is focused in the track. In media where the more absorptive layer is a filter rather than thermo-optically active, a similar result can be achieved, the height variations will be formed into grooves rather than ridges so that the regions over the tracks are thinner, permitting more energy to pass through them to the thermo-optically active layer again imparting added spatial control. In media where more than one thermo-optically active layer are present, ridges or grooves provide a means for controlling where energy in each of the layers is absorbed. In media where grooves are already present for tracking but without differential absorptivities, the addition of differential absorptivity heightens the reflected intensity differential between the on-track and off-track areas, increasing the tracking sensitivity.

Alternatively, the height variations may assume the form of a series of discrete protrusions or depressions along a portion of the track. These protrusions or depressions will be arranged in distinctive sequences to provide the medium with a format for use during recordation and as a guide or template for producing an analogous data sequence in the medium while other data is being recorded on the medium. The data sequences produced from these protrusions or depressions may serve as a format during playback of the recorded data in much the same way as format sequences on standard compact disks.

Still further, both types of height variations may be included in a single medium.

Further advantages and embodiments of the invention will be apparent from the following description.

BRIEF DESCRIPTION OF THE DRAWINGS

FIG. 1 is a plan view of a disk as one example of an optical data storage medium in which the present invention can be incorporated.

FIG. 2 is a cross-sectional view of the medium of FIG. 1 cut along the radial direction.

FIG. 3a is an enlarged cross-sectional view of a medium representing, the prior art, again cut along the radial direction indicated in FIG. 1.

FIG. 3b is a view identical to that of FIG. 3a, except that the medium shown is one within the scope of the present invention.

FIG. 4 is a cross-sectional view of the medium of FIG. 1 cut along the circumferential direction along one of the data tracks.

FIG. 5 shows the same medium and the same view as FIG. 4 after a record beam has passed.

DETAILED DESCRIPTION OF THE INVENTION AND PREFERRED EMBODIMENTS

As an example of the practice and use of the present invention, a detailed explanation of how it may be applied to a specific type of optical data storage medium will be given. The medium is that described in detail above.

In this particular embodiment of the invention the surface of the expansion layer on the side away from the retention layer (and hence the bulges) is modified to be grooved rather than flat. A groove is located on each side of the elongate track along which the pits or bumps are formed. In a disk, of course, the track is curved in a spiral, similar to the groove on a phonograph record. The groove thus forms its own spiral extending along the length of the track spiral, alternating with the track as one cuts across the disk in a radial direction.

The effect of the grooves is to differentiate between the distances that a record beam travels through the expansion layer depending on whether the record beam is focused on a groove or on a track. The thicker track regions absorb more light than the thinner groove regions. Accordingly, any light transmitted through the track regions or reflected back through them (in a double pass) will necessarily be of a lesser intensity than light transmitted through or reflected back through a groove region.

This intensity difference is useful in a number of ways. It can be used as a tracking guide, for example, to keep the record beam centered on the track during recordation. It also permits the use of a thicker expansion layer (and thus greater absorption) in the track regions, without any loss in overall reflectance when a record beam is used which is wider than the track. This has significance in both tracking and focus control. Still further, it promotes the formation of smaller and sharper marks in the reflecting surface (interface or metal film) during recordation.

The invention is particularly effective when applied to media of this description which also include a reflective layer, and particularly to media in which the layers are ordered in the following manner: substrate, expansion, retention, reflection. Both data recordation and reading are achieved in such media by light beams entering the substrate. The invention is also applicable to other arrangements, however, including those in which the beams are not substrate-incident.

Format-type sequences along portions of the track as described above may also be included. These protrusions or depressions will be translated into deformations in the reflective layer as the record beam passes over them.

These features and their operation are shown in detail in the Figures.

FIG. 1 shows an optical data storage medium in the form of a disk 11 similar in size and shape to a conventional compact disk. Subsequent drawings show this disk in cross section, taken in the radial direction 12 and the circumferential direction 13. As will be seen from these subsequent drawings, the disk is formed in layers parallel to the plane of FIG. 1. The cross section drawings are not drawn to scale.

FIG. 2 shows a radial cross section taken along the line 12 of FIG. 1. The layers shown are the substrate 21, expansion layer 22, retention layer 23, reflective layer 24, and a protective compliant layer 25. The arrow 26 represents the direction of approach of incident laser beams, which is the same for the record, read, and erase beams. The thicknesses of these layers may vary. Typically, however, the substrate 21 is the thickness required by compact disk specifications and the protective layer 25 is on the order of tens of microns in thickness. while the expansion layer 22, retention layer 23 and reflective layer 24 are each on the order of 1 micron or less.

The grooves of the present invention appear at the interface 27 between the substrate 21 and expansion layer 22. While the orientation of the grooves will depend of course on the perspective from which they are viewed, each groove 28 may be considered as having a convex side and a concave side—the convex side being the underside according to the orientation in FIG. 2, and the concave side being the upper side. Otherwise stated, the convex side of the groove 28 protrudes into the expansion layer 22. The higher regions 29 of the interface between the grooves may be considered track regions, since they are in vertical alignment with the regions of the reflective surface 24 along which data will be recorded.

In an alternative embodiment of the invention, the low regions 28 of the interface may be used as the track regions, and data will be recorded on the regions directly beneath them on the reflective surface 24 rather than those directly beneath the high interface regions 29. The benefit to be gained by recording under the low interface regions is that the greater absorption occurring in the adjacent regions of the expansion layer 22 under the areas marked 29 will serve to inhibit lateral heat transmission and therefore help focus the data recordation in a narrower region on the reflective surface.

The effect of the grooves during data recordation can be understood from the properties of the individual layers.

The substrate is a rigid transparent material which permits substantially full transmission of light from all three beams—record, read and erase. The substrate is sufficiently thick and rigid to provide structural integrity to the medium, and remains so throughout the entire range of temperatures encountered during recordation and playback. In particular, the substrate does not deform substantially in response to pressure caused by expansive forces in the expansion layer.

The expansion layer 22 is formed of a material which is absorptive of light at the wavelength of the record beam. The expansion layer is only partially absorptive at this wavelength, thereby permitting a double pass of the record beam. The degree of absorptivity may vary, although in general, a double pass absorption of about 40% or greater will provide the best results. In preferred embodiments, the double pass absorption is at least about 40% and less than 90%, and in particularly preferred embodiments, the absorptivity is from about 50% to about 85%. In addition, the expansion layer is at least partially transmissive of light at the wavelength of the erase beam. Although this may vary widely as well, in most applications a transmissivity of at least about 60%, preferably at least about 80%, at this wavelength will provide the best results. A double pass absorption of around 50% helps to create a column of nearly constant temperature material in the expansion layer, eliminating high thermal gradients through the expansion layer that occur with single pass recording. This improves mark formation and definition.

The expansion layer is further categorized by a high coefficient of thermal expansion, particularly when compared to the other layers of the medium. Coefficients above about $1 \times 10^{-4}$ deg C.$^{-1}$ at 20° C. are preferred, with those greater than about $5 \times 10^{-4}$ deg C.$^{-1}$ particularly preferred, and those greater than about $7.5 \times 10^{-4}$ deg C.$^{-1}$ most preferred.

In addition, the expansion layer material is rubbery at or near ambient temperature, i.e., having a high coefficient of elasticity, to the extent that it will expand readily during recordation without exceeding its upper expansive limit. When at ambient temperature, the expansion layer material is near its glass transition temperature, which is preferably below 30° C. Due to the rigidity of the substrate, the expansion layer can only expand in a direction away from the substrate, forming a bulge extending downward into the retention layer.

The retention layer 23 has a set of characteristics distinct from those of the expansion layer. The retention layer is absorptive of light at the wavelength of the erase beam, which differs from that of the record beam in a nonoverlapping manner. The absorptivity of light by the retention layer at the erase beam wavelength is preferably at least about 40%, and more preferably at least about 50%. In addition, the retention layer material is transmissive of light at the wavelength of the record beam, preferably at least about 60%. In certain preferred embodiments, as will be apparent from the description below, the retention layer material is also partially absorptive of light at the record beam, preferably at least about 20%.

The retention layer also has a glass transition temperature which is above ambient temperature. This may be below the temperature reached by the expansion layer during data recordation. With direct heating of the retention layer, however (by absorption of light from the record beam), this need not be so. In general, this glass transition temperature will range from about 50° C. to about 200° C., preferably from about 75° C. to about 125° C. When above the glass transition temperature, the material is rubbery with a high enough elasticity, sufficient to permit it to deform to the contour of the distortion formed in the expansion layer without exceeding its elasticity limit.

In further embodiments of the invention, the retention layer has a high thermal conductivity, causing it to rise in temperature above its glass transition temperature through conduction from the expansion layer. The high thermal conductivity also serves to quickly dissipate the heat outward so that the retention layer will cool back to its glassy state after the pit in the expansion layer has been formed but before the expansion layer has returned to its nonexpanded state. In most applications, the thermal conductivity will be at least about $2.5 \times 10^{-4}$ cal/cm$^2$/°C./sec/cm. preferably at least about $5 \times 10^{-4}$ cal/cm$^2$/°C./sec/cm.

The reflective layer 24 serves to reflect light back through the expansion layer for purposes of recordation, and also for purposes of data detection. The reflection layer is thus highly reflective, preferably reflecting at least about 85% of the light striking it during both recordation and reading. The reflective layer is also deformable so that it conforms to the shape of the pit representing the recorded data for purposes of light scattering.

Certain media of this type also include a protective layer on the underside of the pits to protect them from damage due to contact with external objects. Characteristic of the protective layer is its compliancy, by which it deforms to permit the bumps which are the undersides of the pits to protrude into it. In addition, the compliant layer is relativly thick when compared to the expansion, retention and reflective layers, such that the bumps are not transmitted through the protective layer to its outer surface. It is also preferred that the protective layer have a high thermal conductivity to enable it to function as a heat sink for purposes of rapid cooling of the retention layer immediately after formation of the bumps. In most applications, a thermal conductivity of at least about $5 \times 10^{-4}$ cal/cm$^2$/°C./sec/cm will provide the best results.

The thicknesses of the various layers will be selected in accordance with the optics of the system, including the record, read and erase functions. For instance, in order to maintain the minimum mark size during data recordation, the laser beam should be maintained as small as possible as it passes through the expansion layer. Accordingly, most of the expansion layer should be within the focal depth of the record beam. For recording systems having optical parameters similar to those found in standard compact disk players. the record beam is diffraction limited and has a focal length of approximately 1.0–1.5 microns.

In such cases, best results can be obtained with an expansion layer having a thickness of approximately one micron in the track regions 29. Furthermore, in cases where the retention layer lies between the expansion layer and the reflective layer, as shown in FIG. 2, the retention layer should be as thin as possible, since it will lie in the center of the focal depth. Accordingly, a retention layer of approximately 0.5 micron would be typical. In general, however, the expansion and retention layers will be as thin as possible while still retaining their expandable and retentive characters, respectively.

The substrate and the protective layers are considerably thicker, the substrate layer being on the order of 1 millimeter or more and the protective layer being on the order of tens of microns. The actual thicknesses in any given case will depend on the respective functions of the layers—the substrate layer, for instance, will be thick enough to impart rigidity to the medium, and the protective layer will be thick enough to protect the data protrusions from external abuse.

The grooves formed in the interface between the substrate and the expansion layer will be of dimensions selected in accordance with the materials used, configuration of the system, and optics of the recorder. In general, however, grooves having a depth ranging from about 0.1 to about 0.9 times the thickness of the expansion layer, preferably from about 0.3 to about 0.6 times, will provide the best results. Grooves are preferably at least about 0.15 micron the most in depth, with about 0.3 micron to about 0.6 micron the most preferred. The geometry of a groove, i.e., the profile of its cross section, may vary, although groove profiles with sharp corners are preferred. The angles between the track areas and the walls and floor of a typical groove may vary, but are preferably approximately 90°. As for the groove width, this may vary as well, although widths ranging from about 0.2 to about 0.6, more preferably from about 0.3 to about 0.5, times the width of the track are preferred.

Referring again to FIG. 2, the grooves 28 in this embodiment represent the off-track areas of the medium while the areas 29 in between the grooves represent the track areas. As the record beam enters the medium along the direction of approach indicated by the arrow 26, it passes through the substrate 21, the expansion layer 22 and the retention layer 23 to be reflected at the reflective layer 24 back through the retention and expansion layers and substrate to emerge from the medium for monitoring. Light traveling through the off-track areas (in the grooves 28) thus travels a distance of 2b through the expansion layer 22 before emerging, while light traveling through the track areas 29 travels a distance of $(2a+2b)$ through the expansion layer 22. Since the expansion layer absorbs light at the record beam wavelength, the intensity of the reflected light emerging at the track areas 29 is proportionately less than that emerging at the off-track areas 28. This permits the grooves 28 to be used in tracking the record beam—i.e., keeping it centered on the track during recordation—in a manner analogous to tracking as it is accomplished in a standard compact disk recording.

Tracking techniques based on intensity differences are known to those skilled in the art. As one example of such a technique, the beam from the record laser may be split into three beams—a main beam and two side beams, separated from one another by a distance typically on the order of 20 microns, one side beam being forward (along the track direction) and slightly to one side of the main beam, and the other being behind it and slightly to the other side. This technique may be used in the context of the present invention by centering the main beam on a track, with the side beams partly on that track and partly in the grooves on either side of it. As the side beams are reflected back through the expansion layer, their intensities will vary depending on how much of each beam is on a groove and how much is on a track, due to the difference in absorption. The reflected beams are directed to photoelectric detectors which together with a differential amplifier, produce a control signal representative of the difference in the intensities of these beams.

The control signal in turn controls a tracking servo. When the three beams are positioned such that the portions of the side beams that overlap with the track are identical, the intensities are also identical and the control signal is zero. Once the trio deviates toward one side, however, a difference in overlap between the side beams and the track occurs, and the control signal becomes positive or negative as equired to cause the servo to shift the beams laterally to restore the main beam to the track.

The difference in reflective intensity between the track and the groove for purposes of causing a detectable variation as the beams drift is not critical and can vary according to the system used. In most applications, however, best results will be obtained when the intensity of reflected light emerging from the groove areas is at least about 25% higher than that emerging from the track areas.

A further function of the grooves of the present invention is the focusing of heat generated in the expansion layer to a narrow area. This helps to form a smaller, more sharply defined bulge. This phenomenon is demonstrated in FIGS. 3a and 3b.

The cross section shown in FIG. 3a represents non-grooved media, i.e., where there is no height differentiation between the track and off-track areas in the substrate/expansion layer interface. The direction of the incident read beam is again shown by the arrow 26. Since the intensity of the light is strongest as it first enters the expansion layer 22, the thermal energy in the expansion layer is concentrated near the interface 27. The curved lines 30 shown in the figure are isotherms of graduated temperature, the highest 31 being closest to the center.

The distance between the central energy peak (inside the highest isotherm 31) and the retention layer 23 results in a relatively slow rate of temperature rise in the retention layer 23, and consequently a relatively long period of time during which the pressure builds up in the expansion layer 22 before the retention layer rises above its glass transition temperature. The distribution of pressure in the expansion layer 22 is thus relatively broad by the time the retention layer 23 becomes rubbery, and the ultimate result is a relatively broad and shallow bulge 31 in both the retention and reflection layers.

In the configuration shown in FIG. 3b, the expansion layer 22 has the same thickness at the track area 29, but a lesser thickness on either side of the track where the grooves 28 are formed. Light from the record beam approaching in the direction of the arrow 26 generates the same amount of heat in the expansion layer 22 as in FIG. 3a and does so at the same rate, since the thickness of the expansion layer 22 here is the same. The grooves 28 however place the concentration of energy closer to the retention layer 23. The retention layer thus rises in temperature more quickly, and reaches its glass transition temperature before the expansion layer experiences a pressure buildup like that in FIG. 3a. The result is a more well-defined bulge 32 in the retention and reflection layers.

A further factor contributing to this effect is the difference in thermal expansivity between the substrate 21 and expansion layer 22, the latter having a much higher coefficient of thermal expansion. The pressure buildup is thus confined to a narrow, closely defined column defined by the groove shape, thereby forming a narrow, sharply defined area.

The overall result of these effects is more sharply focused and defined marks representing the data bits, and consequently enhanced accuracy and speed in recording as well as minimized error in playback.

Interface height variations in the form of formatting-type sequences along the track as applied to this type of medium is shown in FIGS. 4 and 5. These figures are cross sections of a portion of a disk taken along the line 13 of FIG. 1, following a track, and are not drawn to scale. As in FIGS. 2 and 3, the incident record beam in FIGS. 4 and 5 is represented by the arrow 26.

During recordation, the disk rotates to the left in the direction of the arrow 40. In these figures, however, the disk itself is the frame of reference. FIG. 4 thus shows the disk portion at a point in time when the record beam 26 is incident at the location shown, and FIG. 5 shows the same disk portion a short time later when the disk has rotated so that the record beam is incident at the new location shown.

The feature shown in these figures is a segment 41 of the track in which the interface 27 between the substrate 21 and the expansion layer 22 contains protrusions 42 extending into the substrate. These protrusions and the valleys 43 between them are of distinctive lengths along the track in a sequence which corresponds to format information which is read and used by the recording sysem during recordation and which at the same time may be converted into a form which can be read and used by a read detection system during playback. The sequence is a binary sequence of bits in which the protrusions are translated into "on" signals and the valleys are translated into "off" signals.

As described above, the substrate 21 is transparent to both record and read beams and the expansion layer 22 contains a dye which is partially absorptive of the record beam. During recordation, the record beam passes through all three layers (substrate 21, expansion 22, and retention 23) and is reflected at the reflective layer 24 back through all three to emerge from the substrate, although at a lower intensity than that at which it entered, due to the absorption. The intensity of the beam emerging from the valleys 43, however, is greater than the intensity of the same beam when it emerges from the protrusions 42, since the greater depth of expansion layer 22 which the beam passes through causes that much more absorption of the beam to occur. A detector sensing the intensity of the emerging beam thus registers a sequence of intensity variations as this segment 41 of the disk rotates past the record beam 26. With appropriate programming, the recording system can use sequences such as these as guides for synchronizing and controlling the recordation of additional data on the medium.

When the incident beam is a read beam, however, to which both the substrate and the expansion layer are transparent, the sequence shown in FIG. 4 will not be detectable, since the reflected beam will show no variations in intensity. To achieve readability by such a read beam, the sequence must be translated into depressions 44 in the reflective layer 24 which scatter the incident light and are thus read as marks by the read detection system.

To accomplish this, the recordation system may be programmed to vary the intensity of the record beam between low (non-recording) and high (recording) levels in accordance with detected variations in the beam's emerging reflection which occur when the beam passes from a protrusion 42 to a valley 43 and vice versa. For example, the record beam detector registers a drop in intensity as the record beam (at its low intensity) passes from a valley 54 to a protrusion 53. Upon detecting this drop, the system raises the record beam intensity to its recording level where it will cause expansion of the expansion layer 22 and corresponding deformations in the retention and reflective layers as in the recordation of data in the general manner described above. Likewise, the record beam detector registers an increase in intensity when the record beam passes from a protrusion to a valley, and the system lowers the record beam intensity accordingly to terminate the expansion and resulting deformations. The protrusion sequence at the substrate/expansion layer interface 27 thus serves as a template for the formation of a format guide in the reflective layer which can be read by a detection system during conventional playback.

The heights of these protrusions will be selected in accordance with the sensitivity of the detection system, and will thus vary with the system. They are otherwise non-critical. In general, however, protrusions of a height ranging from about 0.1 to about 0.9 times the thickness of the expansion layer, preferably from about 0.3 to about 0.6 times, will provide the best results. The protrusions are preferably at least about 0.15 micron in depth, with about 0.3 to about 0.6 micron the most preferred.

The binary sequences formed by the protrusions may serve a variety of format functions for both recordation and playback. They may be arranged, for example, in a manner analogous to the synchronization and control data included on standard compact disks, which generally occur as a series of 38 bits at the beginning of each compact disk frame. They may also serve as lead-in and lead-out signals, time information codes to indicate distance along the length of a track, and a directory of information to be recorded on the medium. The various possibilities will be readily apparent to those skilled in the art.

The materials used in forming the layers will be selected on the basis of the properties indicated above, i.e., transparency, reflectivity, absorptivity, glass transition temperature, elasticity, and thermal expansivity. The preferred materials for all layers except the reflective layer are amorphous polymers. Examples of such materials are rubbers such as butyl rubbers, silicone rubbers, natural rubbers and styrenebutadiene rubbers; polymers such as cellulose acetate, cellulose acetate-butyrate, polystyrene, polysulfonamide, polycarbonate, cellulose nitrate, poly(ethylmethacrylate), poly(vinyl butyral), aromatic polyesters, polyamides, acrylic polymers, polyvinyl acetate, silicone resins, alkyd resins, styrene-butadiene copolymers, vinyl chloride-vinyl acetate copolymers, nitrocellulose, ethylcellulose and polyvinyl alcohol; and substances such as gelatin glue, casein, egg albumin and dihydroabietyl alcohol. The expansion layer should be constructed from materials with high elasticity such as elastomers and polymers with elongations greater than 15%. Flexibilized epoxies with elongations from 15% to 130% and glass transition temperatures from below ambient temperature to 45° C. are particularly preferred. The retention should be constructed from material with relatively high glass transition temperatures, notably greater than 50° C., with elongation greater than 5%. Epoxies with glass transition temperatures of from 75° C. to 145° C. and elongation of 5% to 20% are particularly preferred.

The reflective layer may be formed of any reflective material which is sufficiently elastic and malleable to conform to the bulges protruding from the expansion layer. The material should not unduly constrict bump formation and should not become substantially work hardened over the number of desired write and erase cycles. Examples of such materials are aluminum, copper, gold and indium. Other examples are alloys, particularly eutectic alloys of bismuth with tin or cadmium.

The absorptive characteristics of the various layers may be imparted thereto in conventional ways, preferably by the inclusion of dyes or pigments selected to absorb at the appropriate wavelength. The target wavelengths are not critical, and can vary depending on the types of laser available for use. The wavelengths will generally be selected such that the record and erase wavelengths are distinct and nonoverlapping. The layers may, however, be formulated with some overlap in absorption characteristics. The erase dye in the retention layer, for instance, may be slightly absorbing at the record wavelength. This will result in direct heating of the retention layer during recording as well as erasure. Typical wavelengths for which lasers are available are 680 nm, 780 nm and 830 nm. Examples of dyes or pigments which may be used are nigrosin blue, aniline blue, Calco Oil Blue, ultramarine blue, methylene blue chloride, Monastral Blue, Malachite Green Ozalate, Sudan Black BM, Tricon Blue, Macrolex Green G, DDCI-4 and IR26.

The various layers are bonded together according to conventional techniques. It is preferred that adjacent layers be optically coupled to one another such that substantially all light propagated through one layer enters the adjacent layer. The exception is the reflective layer which reflects a major portion of the light incident upon it.

The media of the present invention may be fabricated in accordance with conventional techniques, whereby the various layers are applied in succession by coating over a substrate. Knife spread techniques, spin coating techniques and metal vapor deposition are examples of techniques which may be used.

The foregoing is offered primarily for purposes of illustration. It will be readily apparent to those skilled in the art that variations in the materials, their physical arrangements, and the various system parameters described herein may be introduced without departing from the spirit and scope of the invention.

What is claimed is:

1. In an optical data storage medium comprised of a plurality of layers including first and second light-transmissive layers and a signal surface susceptible to the formation of optically readable signals, said light-transmissive layers being adjacent to each other and to one side of said signal surface, and said light-transmissive layers being separated by an interface contoured, in a manner which is nonvariable upon exposure of said medium to light, to form variations in the depth of said second light-transmissive layer, the improvement in which said second light-transmissive layer has a higher absorptivity of light per unit depth within a preselected wavelength range than said first light-transmissive layer such that said variations in depth substantially vary the intensity of light reaching said signal surface through said second light-transmissive layer.

2. In an optical data storage medium comprised of a plurality of layers including first and second light-transmissive layers and a signal surface susceptible to the formation of optically readable signals, said light-transmissive layers being adjacent to each other and to one side of said signal surface, and said light-transmissive layers being separated by an interface, said second light-transmissive layer having a higher absorptivity of light per unit depth within a preselected wavelength range than said first light-transmissive layer, the improvement in which said interface is contoured, in a manner which is nonvariable upon exposure of said medium to light, to form variations in the depth of said second light-transmissive layer such that said variations in depth substantially vary the intensity of light reaching said signal surface through said second light-transmissive layer.

3. An optical data storage medium in accordance with claims 1 or 2 further comprising an elongate region designated for storage of optical data and defined as a track, and in which said variations form an elongate ridge on said second layer superimposed over said track.

4. An optical data storage medium in accordance with claims 1 or 2 further comprising an elongate region designated for storage of optical data and defined as a track, and in which said variations form an elongate groove in said second layer superimposed over said track.

5. An optical data storage medium in accordance with claims 1 or 2 further comprising an elongate region designated for storage of optical data and defined as a track, and in which said variations form an elongate ridge in said second layer superimposed over said track.

6. An optical data storage medium in accordance with claims 1 or 2 further comprising a spiral region designated for storage of optical data and defined as a track, and in which said variations form a spiral ridge on said second layer superimposed over said track.

7. An optical data storage medium in accordance with claims 1 or 2 further comprising a spiral region designated for storage of optical data and defined as a track, and in which said variations form a spiral groove in said second layer superimposed over said track.

8. An optical data storage medium in accordance with claims 1 or 2 further comprising an elongate region designated for storage of optical data and defined as a track, and in which said variations form a series of discrete protrusions protruding from said second layer and arranged in a preselected sequence along said track.

9. An optical data storage medium in accordance with claims 1 or 2 in which said second layer is a thermo-optically active layer.

10. An optical data storage medium in accordance with claims 1 or 2 in which said first layer is a rigid substrate, said second layer is an expansion layer, and said signal surface is the surface of said expansion layer opposite said interface, said expansion layer being expandable upon heating to form protrusions on said signal surface, and said optical data storage medium further comprises means for retaining protrustions so formed upon cooling of said expansion layer.

11. In an optical data storage medium in which an elongate region defined as a track is designated for storage of said optical data in a linear arrangement, said medium comprising
- a rigid substrate which is nonvariable upon exposure to light,
- an expansion layer optically coupled to said substrate along an interface therebetween and expandable up heating by light absorption to form protrusions on the surface thereof opposite said interface, and
- means for retaining protrusions so formed upon cooling of said expansion layer, the improvement in which said interace is contoured to form variations in the depth of said expansion layer between said track and regions adjacent to said track, such that said variations in depth substantially vary the intensity of light reaching said surface through said expansion layer.

12. An optical data storage medium in accordance with claim 11 in which said rigid substrate is transparent and said medium further comprises a reflective layer on the side of said expansion layer opposite said rigid substrate to conform to the contour of said surface.

13. An optical data storage medium in accordance with claim 11 in which said interface is contoured to form a groove in said expansion layer on each side of said track.

14. An optical data storage medium in accordance with claim 13 in which said groove is of a depth ranging from about 0.1 to about 0.9 times the thickness of said expansion layer.

15. An optical data storage medium in accordance with claim 13 in which said groove is of a depth ranging from about 0.3 to about 0.6 times the thickness of said expansion layer.

16. An optical data storage medium in accordance with claim 13 in which said groove is of a depth of at least about 0.15 micron.

17. An optical data storage medium in accordance with claim 13 in which said groove is of a depth of about 0.3 micron to about 0.6 micron.

18. An optical data storage medium in accordance with claim 13 in which said groove is of a width ranging from about 0.2 to about 0.6 times the width of said track.

19. An optical data storage medium in accordance with claim 13 in which said groove is of a width ranging from about 0.3 to about 0.5 times the width of said track.

20. An optical data storage medium in accordance with claim 13 in which said groove has a convex side, said medium further comprises a reflective layer on said convex side of said groove substantially conforming to the contour of said surface, and said expansion layer is expandable by absorption of light at a preselected wavelength defined as a record wavelength, and said groove is of a depth such that light at said record wavelength passing through said expansion layer along said groove and reflected off of said reflective layer back through said expansion layer emerges from said expansion layer at an intensity which is on the average at least about 25% higher than that of light so emerging after passing through said expansion layer along said track.

21. An optical data storage medium in accordance with claim 11 in which portions of said interface along a segment of said track are displaced to protrude into said substrate to form a binary sequence of height variations in said interface along said segment.

22. An optical data storage medium in accordance with claim 21 in which said portions are of a height ranging from about 0.1 to about 0.9 times the thickness of said expansion layer.

23. An optical data storage medium in accordance with claim 21 in which said portions are of a height ranging from about 0.3 to about 0.6 times the thickness of said expansion layer.

24. An optical data storage medium in accordance with claim 21 comprising a plurality of said binary sequences positioned at regular intervals along said track.

25. An optical data storage medium in accordance with claim 21 in which the length of said track is comprised of a series of sublengths each corresponding to one frame on a standard compact disk and each having a leading end and a tailing end, and one said preselected binary sequence is located at the leading end of each said sublength.

26. An optical data storage medium in accordance with claim 21 comprising a plurality of said binary sequences positioned along said track, said binary sequences representing coded instructions to synchronize the movement of said track with a detection system.

27. An optical data storage medium in accordance with claim 21 comprising a plurality of said binary sequences positioned along said track, said binary sequences representing coded information regarding the distance of said binary sequences along the length of said track.

28. An optical data storage medium in accordance with claim 21 comprising a plurality of said binary sequences positioned along said track, said binary sequences representing a coded directory of data to be recorded on said track.

29. In an optical data storage medium in which an elongate region defined as a track is designated for storage of said optical data in a linear arrangement, said medium comprising
- a rigid transparent substrate,
- an expansion layer optically coupled to said substrate along an interface therebetween and expandable upon heating by absorption of light at a preselected wavelength defined as a record wavelength to form protrusions on the surface thereof opposite said interface,
- a retention layer optically coupled to said expansion layer at said surface and which converts from a glassy state to a rubbery state when heated to a temperature above ambient temperature to conform to the contour of said expansion layer, and
- a reflective layer bonded to said retention layer and deformable to substantially conform to the contour thereof; the improvement in which said interface contains a groove on each side of said track extending into said expansion layer to a depth such that light at said record wavelength entering said expansion layer at said groove, transmitted therefrom through said retention layer and reflected off of said reflective layer back through said retention and expansion layers emerges from said expansion layer at an intensity which is on the average at least about 25% higher than that of light entering said expansion layer and so transmitted, reflected and emerging therefrom at said track.

* * * * *